United States Patent
Xiang et al.

(10) Patent No.: US 8,250,138 B2
(45) Date of Patent: Aug. 21, 2012

(54) FILE TRANSFER SECURITY SYSTEM AND METHOD

(75) Inventors: Yang Xiang, Shenzhen (CN); Wen-Hu Wu, Shenzhen (CN); Jian-Hui Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 211 days.

(21) Appl. No.: 12/697,344

(22) Filed: Feb. 1, 2010

(65) Prior Publication Data

US 2011/0060789 A1    Mar. 10, 2011

(30) Foreign Application Priority Data

Sep. 4, 2009   (CN) .......................... 2009 1 0306609

(51) Int. Cl.
*G06F 15/16* (2006.01)

(52) U.S. Cl. ........ 709/203; 709/206; 709/215; 709/219; 713/182; 726/26; 726/27

(58) Field of Classification Search .................. 709/203, 709/206, 219, 215; 726/25, 27, 26; 713/182
See application file for complete search history.

(56) References Cited

U.S. PATENT DOCUMENTS

| | | | |
|---|---|---|---|
| 7,003,799 B2 * | 2/2006 | Jorgenson ........................ | 726/12 |
| 7,818,390 B2 * | 10/2010 | Zhang et al. ................... | 709/215 |
| 7,849,502 B1 * | 12/2010 | Bloch et al. ..................... | 726/11 |
| 2003/0135403 A1 * | 7/2003 | Sanderson et al. ................ | 705/8 |
| 2005/0086387 A1 * | 4/2005 | Clark ............................. | 709/249 |
| 2006/0020814 A1 * | 1/2006 | Lieblich et al. ............... | 713/182 |
| 2008/0301297 A1 * | 12/2008 | Malcolm et al. .............. | 709/225 |
| 2009/0070478 A1 * | 3/2009 | Herman et al. ............... | 709/231 |
| 2011/0078309 A1 * | 3/2011 | Bloch et al. ................... | 709/224 |

* cited by examiner

*Primary Examiner* — Moustafa M Meky
*Assistant Examiner* — Michael C Lai
(74) *Attorney, Agent, or Firm* — Altis Law Group, Inc.

(57) ABSTRACT

In a file transfer security system and method, a file transfer request sent to a file server is intercepted. The need for examination of the file transfer request is assessed, and, if present, an auditor is notified to examine the file transfer request and award approval or rejection thereof. File operations are executed according to the examination result.

15 Claims, 3 Drawing Sheets

FILE TRANSFER SECURITY SYSTEM AND METHOD

CROSS REFERENCE TO RELATED APPLICATION

This application is related to China patent application 200910306609.0 (filed Sep. 4, 2009), the full disclosure of which is incorporated herein by reference.

BACKGROUND

1. Technical Field

Embodiments of the present disclosure relate to systems and methods of data transmission, and particularly to a file transfer security system and method.

2. Description of Related Art

File servers, such as file transfer protocol (FTP) servers, are widely accessed via the Internet. Upon logging onto a file server, a user is often able to manipulate files stored therein, including uploading, downloading, deleting, and modifying files. If unrestricted, such operations often cause security issues, such as when confidential or sensitive data is accessed without authority.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
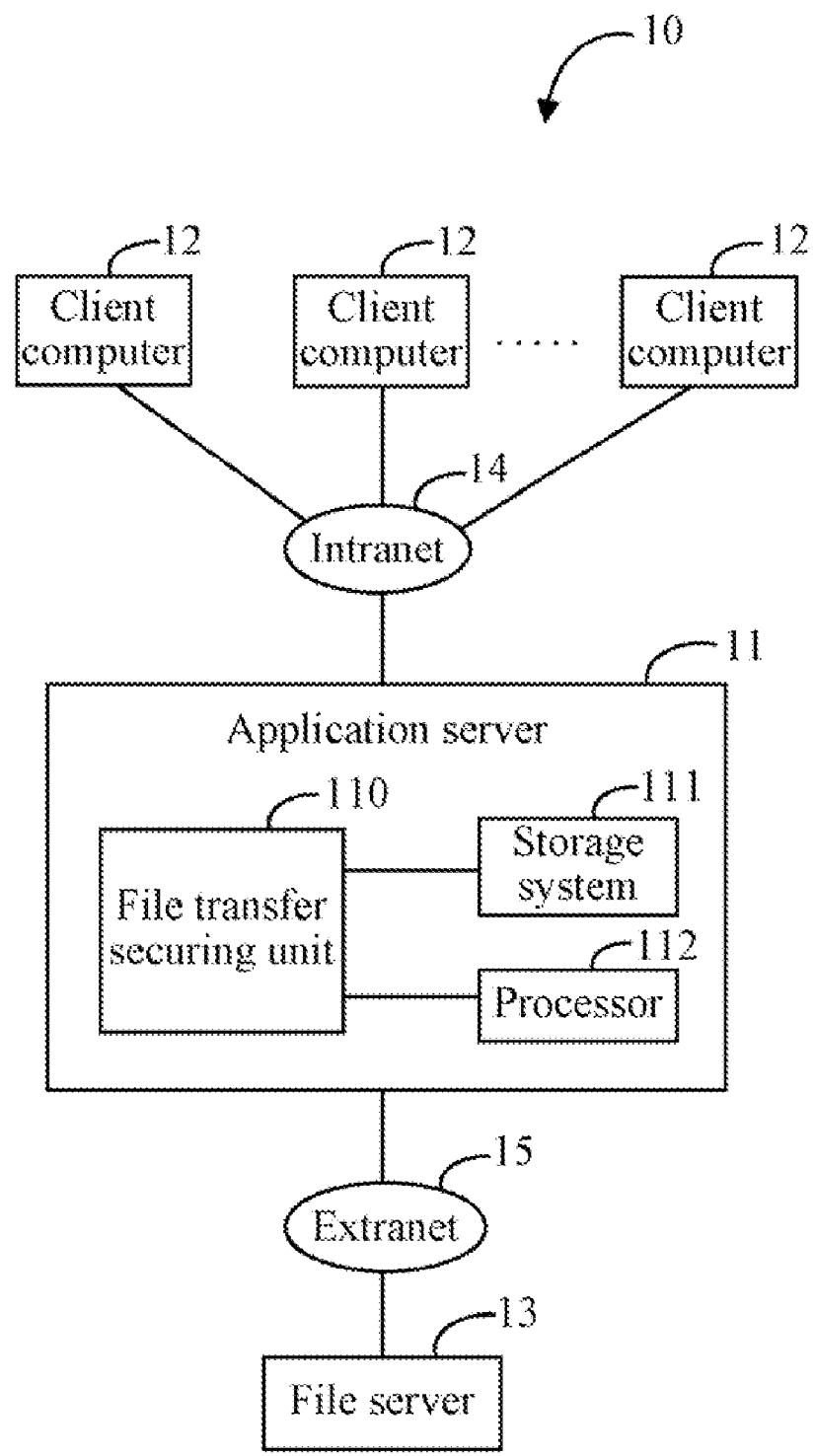
FIG. 1 is a block diagram of one embodiment of a file transfer security system.

FIG. 1 is a block diagram of one embodiment of a file transfer security system 10. The system 10 may include an application server 11, at least one client computer 12, and a file server 13. The application server 11 is connected to the client computer 12 over an intranet 14. The application server 11 is further connected to the file server 13 over an extranet 15, such as the Internet. In one embodiment, the file server 13 is a file transfer protocol (FTP) server that provides file transfer services applying FTP. The file transfer services may include uploading, downloading, deleting, and modifying files. The client computer 12 sends file transfer requests to the file server 13 to request file transfer services.

In one embodiment, the application server 11 may include a file transfer securing unit 110, a storage system 111, and at least one processor 112. One or more computerized codes of the file transfer securing unit 110 may be stored in the storage system 111 and be executed by the at least one processor 112. The file transfer securing unit 110 may determine whether the file transfer requests sent from the client computer 12 are approvable before the client computer 12 exchanges or manipulates files in the file server 13.

Figure 2:
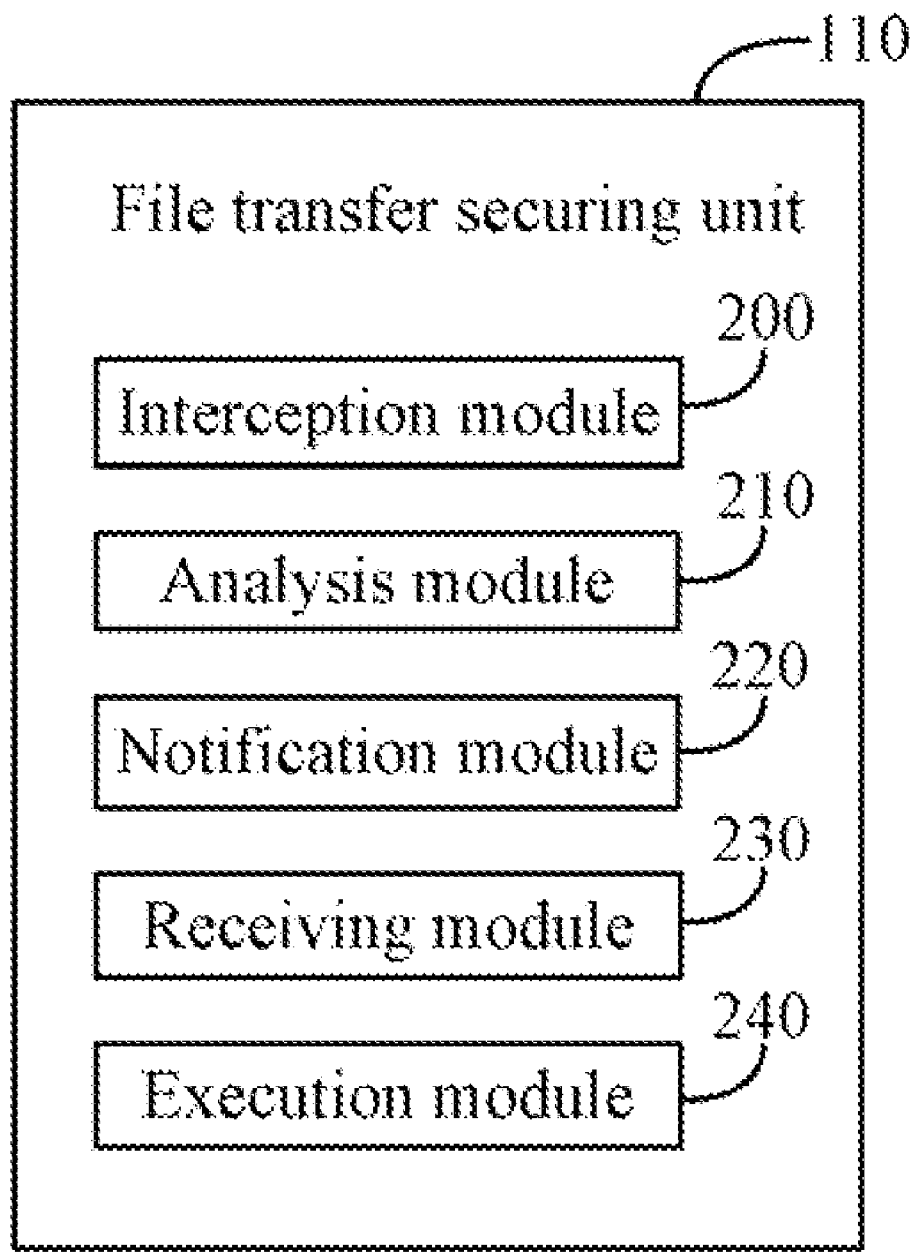
FIG. 2 is a block diagram of one embodiment of a file transfer securing unit of FIG. 1 comprising function modules.

FIG. 2 is a block diagram of one embodiment of the file transfer securing unit 110 of FIG. 1 comprising function modules. In one embodiment, the file transfer securing unit 110 includes an interception module 200, an analysis module 210, a notification module 220, a receiving module 230, and an execution module 240.

The interception module 200 is operable to intercept a file transfer request sent from the client computer 12 to the FTP server 13, and record relevant information of the request. The relevant information of the file transfer request can include a user ID, a request time, an IP address of the client computer 12, a file name, and a file size. Files to be uploaded with the file transfer request can also be intercepted.

The analysis module 210 is operable to analyze the relevant information of the file transfer request to assess the need for examination of the file transfer request.

The notification module 220 is operable to notify an auditor to examine the file transfer request and award approval or rejection thereof, such as by e-mails, in one embodiment. The auditor may be selected according to the user ID.

The receiving module 230 is operable to receive an examination result from the auditor. The receiving module 230 may generate a user interface, such as a webpage, by which the auditor can examine the file transfer request. In another embodiment, the examination result can be returned by e-mails or short message service (SMS) text messages. The receiving module 230 may provide an accompanying file to be uploaded to the auditor as part of the request for examination.

The execution module 240 is operable to execute file operations according to the examination result. The execution module 240 may execute file operations corresponding to the file transfer request via the extranet 15 upon approval thereof. If the file transfer request is rejected, the execution module 240 informs the client computer 12 of the file transfer failure.

Figure 3:
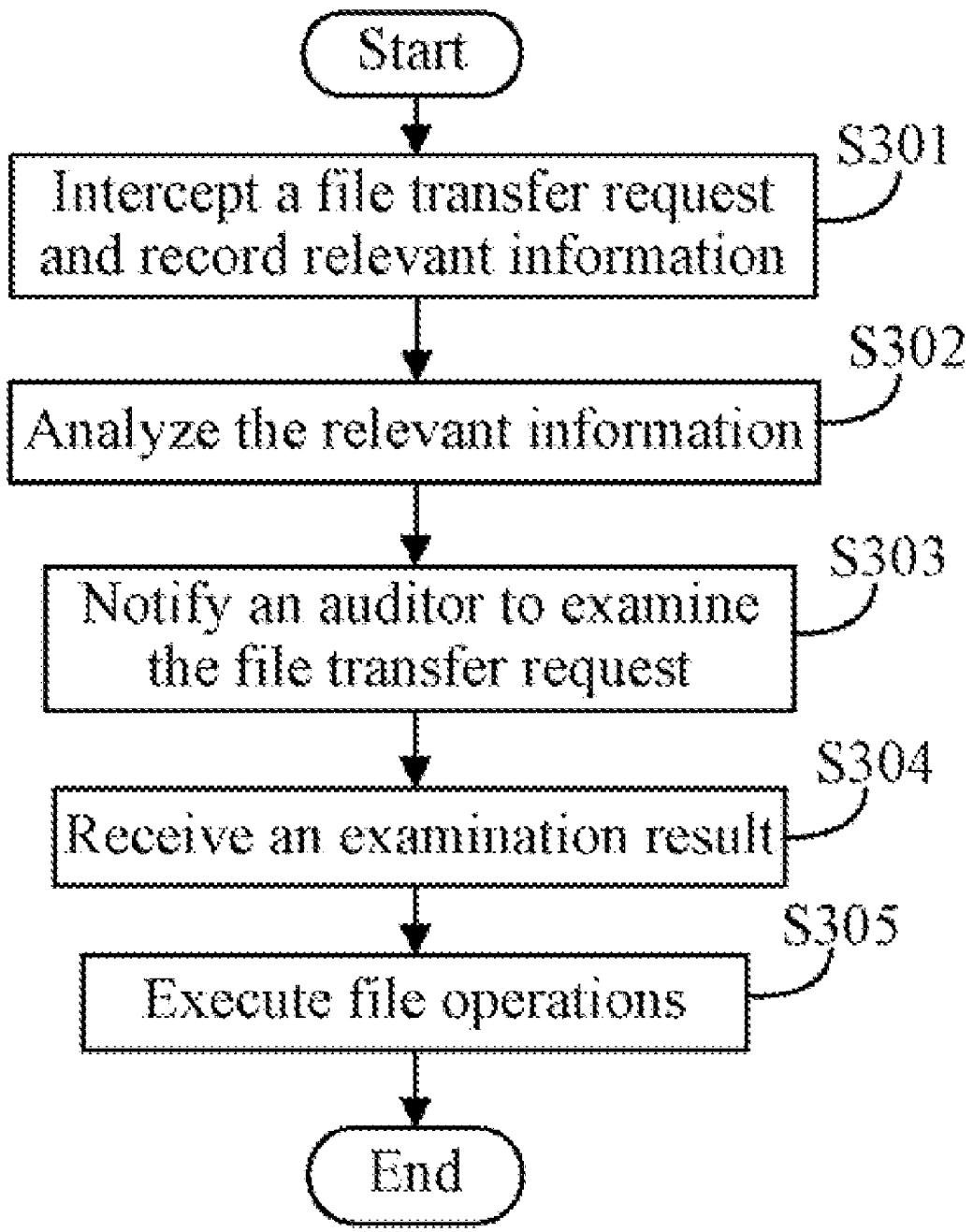
FIG. 3 is a flowchart of one embodiment of a file transfer security method implementing a system such as, for example, that of FIG. 1.

FIG. 3 is a flowchart of one embodiment of a file transfer security method implementing a system such as, for example, that of FIG. 1. Depending on the embodiments, additional blocks may be added, others removed, and the ordering of the blocks may be changed.

In block S301, the interception module 200 intercepts a file transfer request from the client computer 12 to the FTP server 13, and records relevant information thereof. The file transfer request may target upload, download, deletion, or modification of files. Relevant information of the file transfer request includes, for example, a user ID, a request time, an IP address of the client computer 12, a file name, and a file size, all of which are here registered by recording module 200. It is to be noted that the interception module 200 may intercept a file to be uploaded accompanying the file request.

In block S302, the analysis module 210 analyzes the relevant information of the file transfer request, such as the file name, to assess the need for examination of the file transfer request.

In block S303, the notification module 220 notifies an auditor to examine the file transfer request and award approval or rejection thereof, in one embodiment, by e-mails. Depending on the embodiment, the auditor may be selected according to other relevant information of the file transfer request, such as the user ID or IP address of the client computer 12. The notification module 220 may notify the auditor to determine the file transfer request by other means, such as a short message service (SMS) text message.

In block S304, the receiving module 230 receives an examination result from the auditor. In one embodiment, the receiving module 230 may generate a user interface, such as a webpage, by which the auditor examines the file transfer request. For example, the receiving module 230 can sort the relevant information of the file transfer request according to the request time. A webpage with the sorted relevant information is generated and made available. In another embodiment, the receiving module 230 may receive the examination result from the auditor by e-mails or SMS text messages. The receiving module 230 may make the file to be uploaded available to the auditor while a file request for uploading the file is determined.

In block S305, the execution module 240 executes file operations according to the examination result. In one example, the execution module 240 transfers a file to be uploaded to the file server 13 via the extranet 15 if a file request for uploading the file is approved. Otherwise, if the file request for uploading the file is rejected, the execution module 240 informs the client computer 12 of the file upload failure. In another example, the execution module 240 deletes a file from the file server 13 if a file request for deleting the file is approved. Otherwise, if the file request for deleting the file is rejected, the execution module 240 informs the client computer 12 of the file deletion failure.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A file transfer security system, comprising:
a storage system;
at least one processor; and
a file transfer securing unit stored in the storage system and being executable by the at least one processor, the file transfer securing unit comprising:
an interception module configured to intercept a file transfer request sent to a file server from a client computer, and record relevant information of the file transfer request, wherein the relevant information of the file transfer request comprises a user ID, a request time of the file transfer request, an IP address of the client computer, a file name of a file of the file transfer request, and a file size of the file;
an analysis module configured to assess the need for examination of the file transfer request according to the relevant information;
a notification module configured to notify an auditor to examine the file transfer request and award approval or rejection thereof, wherein the auditor is selected according to the user ID;
a receiving module configured to sort the relevant information according to the request time, generate a webpage with the sorted relevant information provided to the auditor to examine the file transfer request, and receive an examination result from the auditor; and
an execution module configured to execute file operations according to the examination result.

2. The system of claim 1, wherein the file transfer request targets upload, download, deletion, or modification of the file.

3. The system of claim 1, wherein the file server is a file transfer protocol (FTP) server.

4. The system of claim 1, wherein the notification module notifies the auditor to examine the file transfer request by e-mails or short message service (SMS) text messages.

5. The system of claim 1, wherein the receiving module receives the examination result from the auditor by e-mails or SMS text messages.

6. A file transfer security method, comprising:
intercepting a file transfer request sent to a file server from a client computer, and recording relevant information of the file transfer request, wherein the relevant information of the file transfer request comprises a user ID, a request time of the file transfer request, an IP address of the client computer, a file name of a file of the file transfer request, and a file size of the file;
assessing the need for examination of the file transfer request according to the relevant information;
notifying an auditor to examine the file transfer request and award approval or rejection thereof, wherein the auditor is selected according to the user ID;
sorting the relevant information according to the request time, generating a webpage with the sorted relevant information provided to the auditor to examine the file transfer request, and receiving an examination result from the auditor; and
executing file operations according to the examination result.

7. The method of claim 6, wherein the file transfer request targets upload, download, deletion, or modification of the file.

8. The method of claim 6, wherein the file server is a file transfer protocol (FTP) server.

9. The method of claim 6, wherein the auditor is notified to examine the file transfer request by e-mails or short message service (SMS) text messages.

10. The method of claim 6, wherein the examination result is received from the auditor by e-mails or SMS text messages.

11. A non-transitory computer-readable medium having stored thereon instructions that, when executed by a computerized device, cause the computerized device to execute a file transfer security method, the method comprising:
intercepting a file transfer request sent to a file server from a client computer, and recording relevant information of the file transfer request, wherein the relevant information of the file transfer request comprises a user ID, a request time of the file transfer request, an IP address of the client computer, a file name of a file of the file transfer request, and a file size of the file;
assessing the need for examination of the file transfer request according to the relevant information;
notifying an auditor to examine the file transfer request and award approval or rejection thereof, wherein the auditor is selected according to the user ID;
sorting the relevant information according to the request time, generating a webpage with the sorted relevant information provided to the auditor to examine the file transfer request, and receiving an examination result from the auditor; and
executing file operations according to the examination result.

12. The medium of claim 11, wherein the file transfer request targets upload, download, deletion, or modification of the file.

13. The medium of claim 11, wherein the file server is a file transfer protocol (FTP) server.

14. The medium of claim 11, wherein the auditor is notified to examine the file transfer request by e-mails or short message service (SMS) text messages.

15. The medium of claim 11, wherein the examination result is received from the auditor by e-mails or SMS text messages.

* * * * *